US009275239B2

(12) United States Patent
Armington et al.

(10) Patent No.: US 9,275,239 B2
(45) Date of Patent: Mar. 1, 2016

(54) TRANSACTION GATEWAY (75) Inventors: John P. Armington, Marietta, GA (US);
David Graves, Monte Sereno, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/122,619

(22) PCT Filed: May 27, 2011

(86) PCT No.: PCT/US2011/038305
§ 371 (c)(1),
(2), (4) Date: Nov. 26, 2013

(87) PCT Pub. No.: WO2012/166087
PCT Pub. Date: Dec. 6, 2012

(65) Prior Publication Data
US 2014/0101774 A1    Apr. 10, 2014

(51) Int. Cl.
*G06F 21/60*    (2013.01)
*H04L 12/66*    (2006.01)
(52) U.S. Cl.
CPC ............... *G06F 21/60* (2013.01); *H04L 12/66* (2013.01)
(58) Field of Classification Search
CPC ........ H04L 63/20; H04L 12/66; G06Q 10/06; G06F 21/60
USPC .......... 726/3–26; 713/159, 193; 709/206–249
See application file for complete search history.

(56) References Cited

U.S. PATENT DOCUMENTS

| 5,963,925 A | 10/1999 | Kolling et al. |
| 7,181,519 B2 | 2/2007 | Pillai et al. |
| 7,805,415 B1 * | 9/2010 | Flesher et al. ................ 707/694 |
| 7,814,232 B2 | 10/2010 | Satapati et al. |
| 7,865,584 B2 | 1/2011 | Grossner et al. |
| 8,793,756 B2 * | 7/2014 | Mock et al. ........................ 726/1 |
| 2001/0032192 A1 | 10/2001 | Putta et al. |
| 2002/0194138 A1 | 12/2002 | Dominguez et al. |
| 2004/0216098 A1 | 10/2004 | Roe et al. |
| 2004/0255137 A1 | 12/2004 | Ying |
| 2005/0125347 A1 | 6/2005 | Akialis et al. |
| 2006/0031476 A1 | 2/2006 | Mathes et al. |
| 2007/0022469 A1 | 1/2007 | Cooper et al. |
| 2007/0055893 A1 * | 3/2007 | Dodd ............................ 713/193 |

(Continued)

FOREIGN PATENT DOCUMENTS

EP    2166716    3/2010

OTHER PUBLICATIONS

European Patent Office, European Search Report Mail Date Nov. 19, 2014, Application No. 11866770.8-1505/2697943 PCT/US2011/038305.

(Continued)

*Primary Examiner* — Amir Mehrmanesh
(74) *Attorney, Agent, or Firm* — Hewlett-Packard Patent Department (57) ABSTRACT

According to one aspect of an example, there is provided a transaction gateway in a first network for receiving a transaction from the first network and for sending the transaction to a transaction processor in a second network. The transaction gateway is arranged to identify restricted data in the transaction, to modify the received transaction by replacing identified restricted data with replacement data different to the identified restricted data, and to send the modified transaction to the transaction processor in the second network.

14 Claims, 6 Drawing Sheets

(56) References Cited

U.S. PATENT DOCUMENTS

| | | | | |
|---|---|---|---|---|
| 2007/0067399 | A1* | 3/2007 | Kulkarni et al. | 709/206 |
| 2007/0078988 | A1 | 4/2007 | Miloushev et al. | |
| 2008/0118150 | A1* | 5/2008 | Balakrishnan et al. | 382/176 |
| 2009/0144446 | A1 | 6/2009 | Olakangil et al. | |
| 2009/0287837 | A1* | 11/2009 | Felsher | 709/229 |
| 2010/0077205 | A1* | 3/2010 | Ekstrom et al. | 713/153 |
| 2010/0257612 | A1 | 10/2010 | McGuire et al. | |

OTHER PUBLICATIONS

International Search Report and Written Opinion for PCT/US2011/038305, Korean Intellectual Property Office, dated Dec. 16, 2011.

Bradley Mitchell, "Can You Hide Your Public IP Address?," Dec. 5, 2010, <http://web.archive.org/web/20101205214046/http://compnetworking.about.com/od/workingwithipaddresses/f/hideipaddress.htm>.

CampaignMonitor, "How we keep your data secure and backed up," Jul. 24, 2010, <http://web.archive.org/web/20100724105216/http://help.campaignmonitor.com/topic.aspx?t=98>.

Falken Secure Networks, "Voltage SecureData™," Feb. 12, 2009, <http://www.falkensecurenetworks.com/PDFs/Voltage_SecureData.pdf>.

Jeff Tyson, "How Network Address Translation Works," Mar. 7, 2010, Howstuffworks.com, <http://web.archive.org/web/20100307214448/http://computer.howstuffworks.com/nat.htm/printable>.

K. Egevang et al., "The IP Network Address Translator (NAT)," May 1994, Network Working Group, Request for Comments: 1631, <https://www.ietf.org/rfc/rfc1631.txt>.

Microsoft, "A NAT example," Jan. 21, 2005, TechNet, (web page), <https://technet.microsoft.com/en-us/library/cc780783%28v=ws.10%29.aspx>.

NASCIO, "NASCIO's Survey on Enterprise Data Center Consolidation in the States: Strategies and Business Justification," Aug. 2007, <http://www.nascio.org/publications/documents/NASCIO-EnterpriseDataCenterConsolidation.pdf>.

osTicket, "Features," Apr. 29, 2011, (web page), <http://web.archive.org/web/20110429165413/http://www.osticket.com/features.php>.

osTicket, "osTicket," Apr. 27, 2011, (web page), <http://web.archive.org/web/20110427183123/http://www.osticket.com/>.

Raz et al., "An SNMP Application Level Gateway for Payload Address Translation," Jul. 7, 2000, Network Working Group, <https://tools.ietf.org/html/draft-ietf-nat-snmp-alg-05>.

Roger Godinho, "data center," Sep. 5, 2000, (web page), TechTarget, SearchDataCenter.com, <http://web.archive.org/web/20110720214315/http://searchdatacenter.techtarget.com/definition/data-center?vgnextfmt=print>.

Voltage Security, "Data Sheet: Voltage SecureData™ Masking," Apr. 11, 2011, <http://web.archive.org/web/20110813011852/http://www.voltage.com/pdf/Voltage_SecureData_Data_Sheet_Masking.pdf>.

Voltage Security, "Voltage Identity-Based Encryption," Jan. 11, 2011, <http://web.archive.org/web/20110111080422/http://www.voltage.com/technology/ibe.htm>.

Voltage Security, "Voltage SecureData™ Enterprise," May 13, 2011, <http://web.archive.org/web/20110513120713/http://www.voltage.com/products/end-to-end.htm>.

Voltage Security, "Voltage Security Format-Preserving Encryption (FPE)," Jun. 19, 2010, <http://web.archive.org/web/20100619104425/http://www.voltage.com/technology/format-preserving-encryption.htm>.

Voltage Security, "What is Key Management?," Apr. 14, 2011, <http://web.archive.org/web/20110414064732/http://www.voltage.com/technology/key-management.htm>.

Voltage Security, Inc., "Voltage SecureData™ Masking," Dec. 11, 2010, <http://web.archive.org/web/20101211164443/http://www.voltage.com/products/data-masking.htm>.

Voltage Security, Inc., "Voltage SecureData™," Apr. 11, 2011, <http://web.archive.org/web/20110411063517/http://www.voltage.com/products/data_protection.htm>.

WhatIsMyIPAddress.com, "What is Network Address Translation?," Dec. 23, 2010, <http://web.archive.org/web/20101223094539/http://whatismyipaddress.com/nat>.

Wikipedia, "Domain Name System," Apr. 30, 2011, <https://en.wikipedia.org/w/index.php?title=Domain_Name_System&oldid=426728616>.

Zoho Corp., "Trouble Ticketing Software," SupportCenter Plus, Apr. 19, 2010, <http://web.archive.org/web/20100419055717/http://www.manageengine.com/products/support-center/trouble-ticket-software.html?>.

\* cited by examiner

TRANSACTION GATEWAY

CLAIM FOR PRIORITY

The present application is a national stage filing under 35 U.S.C 371 of PCT application No. PCT/US2011/038305, having an international filing date of May 27, 2011, the disclosures of which is hereby incorporated by reference in its entirety.

BACKGROUND

In order to conduct business or to operate, businesses and organizations often collect data about individuals or objects. The collected data enables individuals or objects to be identified, and may also be used to enable the individuals or objects to be communicated with. Types of data collected in this context may include, for example, personally identifiable information (PII) that may uniquely identify an individual, or that may be used with other data to identify an individual. In the context of an object, such as a computing device, identifying data may include an Internet protocol (IP) address, a host name, and location information.

In many countries the use of personally identifiable information may be governed by legislation, such as data privacy or data protection legislation. One example of such legislation is the United Kingdom's Data Protection Act. In many countries, legislation may prohibit personally identifiable information from being sent outside of a country or region (such as the European Economic Area) borders.

Such legislation, however, may be inconvenient for businesses and organizations that operate in and obtain personally identifiable information from multiple countries or regions.

BRIEF DESCRIPTION

Examples and embodiments of the invention will now be described, by way of non-limiting example only, with reference to the accompanying drawings, in which.

DETAILED DESCRIPTION

For businesses and organizations that operate in multiple countries, legislation that prohibits personally identifiable information (PII) or other data from being sent outside of the country or region may be particularly problematic or inconvenient.

For example, a business wishing to operate an Information Technology (IT) support center in one country to provide support to clients in other countries may be unable to do so depending on the country in which the support center is located and the specific legislation in place in the countries for which the support center is to provide support. For example, if a support center is located in the United States and support is to be provided for clients located in the United Kingdom, UK legislation may prevent personally identifiable information collected in the UK from being sent to a service center in the US. Presently, in order to comply with data privacy legislation, a support center may have to be located within a country to which PII may be sent according to local legislation.

Accordingly, this prevents businesses from being able to offer the scales of economy and service levels achievable by providing centralized support centers, resulting in higher costs for both the businesses and the clients.

The same situation applies to examples other than support centers, and indeed to any situation where a business or organization would like to process transactions including personally identifiable information in a country that is prohibited from being sent PII under legislation applicable to the country where the PII was obtained.

Examples of the principles described herein provide techniques that enable transactions that include data to which restrictions apply (hereinafter referred to generally as restricted data), such as personally identifiable information, to be processed outside of a country where the restricted data is, without contravening any restrictions that apply thereto.

Figure 1:
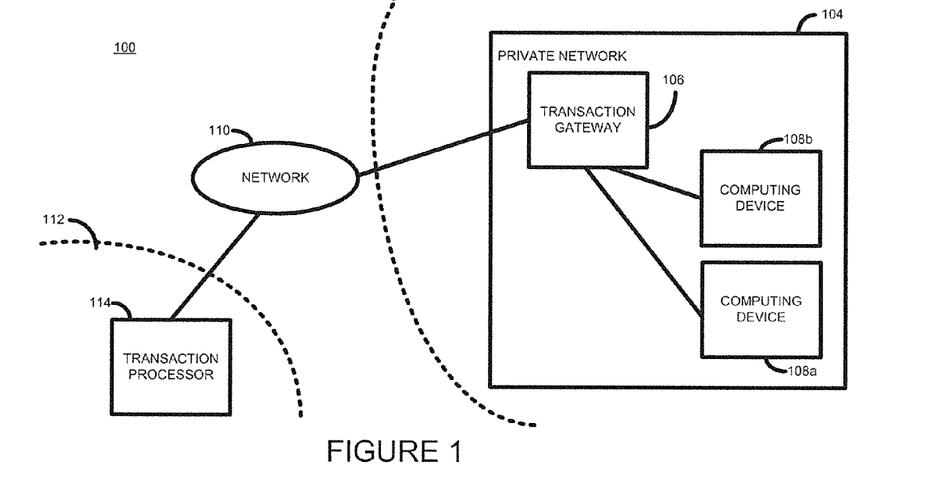
FIG. 1 is a simplified block diagram illustrating a system according to one example.

Referring now to FIG. 1, there is shown a simplified block diagram illustrating a system according to an example of principles described herein.

A first area 102, such as a state, country, territory, or region, is shown which has legislation, or other restrictions, that apply to certain types of data (i.e. restricted data) within the area 102. As previously discussed, restricted data may have restrictions applicable thereto which may prohibit restricted data from being sent outside of the area 102. Restricted data may include, for example, personally identifiable data, or other kinds of data having restrictions, such as legal restrictions, business restrictions, security restrictions, or other restrictions, imposed thereon.

Within area 102, a private computer network 104 is shown having computing devices 108a and 108b. The private computer network 104 may, for example, be a company or organization computer network. The computing devices 108 may be any suitable computing device, including a computer server, a personal computer, a mobile telephone, a smartphone, and a laptop computer.

At times, a computing device 108 may generate or originate an electronic transaction comprising restricted data that is to be sent, over a network 110, such as the Internet or a private network, for processing by a transaction processor 114 in a second area 112.

In one example, a computing device 108 may be a user terminal used by a user for generating a transaction comprising personally identifiable information relating to the user. An example of such a transaction may be a transaction including personal medical data to be sent to a healthcare processing center.

In a second example, a computing device 108*b* may be a computer server that generates a transaction comprising data that may be used to identify the computer server. An example of such a transaction may be a transaction including computing device data to be sent to an IT support service. Although this kind of data may not strictly be personally identifiable data, it may be convenient to treat the data as such. For example, the operator of the client network 104 may not wish for the identity of a computer server in the network to be communicated outside of the network 104 or outside of the area 102. For instance, if the private network is a government network, data identifying a particular server may be considered a national security issue. Accordingly, restricted data may comprise data relating to individuals, as well as data relating to objects such as computing devices.

In one example, a transaction comprises both restricted data and non-restricted data.

Table 1 below shows an example transaction comprising both restricted and non-restricted data relating to a user of computing device 108.

TABLE 1

EXAMPLE OF USER TRANSACTION

| FIELD | DATA VALUE |
| --- | --- |
| Name: | John |
| Surname: | Smith |
| Telephone: | +1.123456789 |
| Social Security Number: | 987654321 |
| Email address: | jsmith@company.com |
| Customer Reference: | js123456 |
| Bank Account Number: | 1234.5678.2468.1357 |
| Medical Details: | Request reimbursement for recent surgical procedure |
| Procedure: | Coronary angioplasty |
| Treatment Cost: | $12750 |
| Hospital Name: | Dallas County Hospital |
| . . . | . . . |

Table 2 below shows an example transaction comprising both restricted and non-restricted data relating to a user of computing device 108.

TABLE 2

EXAMPLE OF COMPUTING DEVICE TRANSACTION

| FIELD | DATA VALUE |
| --- | --- |
| Device IP address: | 68.123.45.120 |
| Host Name: | Secret_Server_1 |
| Problem description: | Server storage 95% full |
| Problem severity: | Critical |
| Configuration: | Storage = SAN |
|  | LogicalUnit = 100 Gb |
|  | Quantity = 4 |
| . . . | . . . |

In one example, the computer device 108 generates a transaction using an application executing on the computing device 108. For example, the computing device 108 may automatically generate a transaction requesting IT support using a support or monitoring application (not shown) executing on the computing device 108. The monitoring application may generate a support request based on monitored parameters of the computing device.

In another example, a transaction may be generated by a user using the computing device to connect to a remote application, such as a web application, executing on a different computing device in the private network 104, such as on a transaction gateway 106.

The transaction gateway 106 serves as a gateway through which transactions to be sent outside of the network 104 are sent. The transaction gateway 106 processes all outgoing transactions to ensure that no restricted data is sent outside the network 104. In this way, transactions generated within the network 104 may be processed by a transaction processor outside of the network 104 (or outside of the area 102) without breaching any restrictions applicable to any restricted data. Operation of the transaction gateway 106 will now be described, in accordance with principles described herein, with further reference to the flow diagrams of FIGS. 2, 3, and 4.

At block 202 (FIG. 3), the transaction gateway 106 receives a transaction. As previously mentioned, in one example the received transaction may be generated by a computing device 108, and in another example the transaction may be generated by a different computing device, such as web server, through interaction of a user of the computing device 108.

Figure 2:
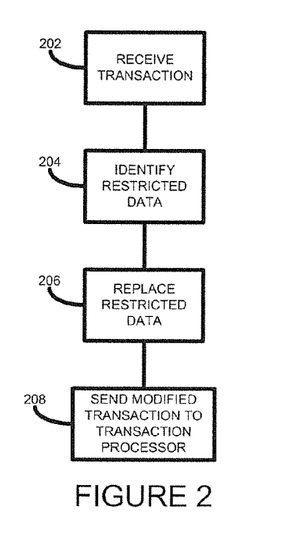
FIG. 2 is a simplified flow diagram outlining a method of operating an element of FIG. 1 according to one example.

At block 204 the transaction gateway 106 identifies any restricted data in the received transaction. In one example, restricted data may not be transmitted outside of the network 104. In a further example restricted data may not be transmitted outside of the area 102. In one example the restricted data may include personally identifiable information.

In one example, where the transaction gateway 106 receives a transaction in a predetermined format, it may identify restricted data therein by identifying one or more predetermined data fields within the transaction. In another example, the transaction gateway 106 may identify restricted data by identifying a restricted data flag (not shown) associated with data fields in a transaction comprising restricted data. In a yet further example, the transaction gateway 106 may identify restricted data by performing lexical or other suitable textual or numerical analysis on data in the received transaction. For instance, the transaction gateway may, in one example, identify data contained in a client network database (not shown) containing, for example, name, address, and telephone number, within the transaction as restricted data.

At block 206 the transaction gateway 106 replaces any identified restricted data with replacement data.

In one example, each identified item of restricted data is replaced by a key, a random number, a token, a UUID, or the like, in such a way that the original data is not directly derivable from the replacement data.

In a further example each identified item of restricted data may be replaced by an encrypted version of the restricted data item, for example using a private key that is not known outside of the private network 104. However, use of encryption may not be permitted under certain legislation or restrictions since there is at least a theoretical risk that the restricted data be derivable from an encrypted version thereof.

It is important to note, however, in the present examples that any non-restricted data is not modified.

At block 208 the modified transaction is sent to the transaction processor 114 in the area 112 via the network 110.

An example of a modified transaction is shown below in Table 3.

TABLE 3

EXAMPLE OF MODIFIED TRANSACTION

| FIELD | DATA VALUE |
|---|---|
| Name: | 0x665473 |
| Surname: | 0x345723 |
| Telephone: | 0x993456 |
| Social Security Number: | 0x127759 |
| Email address: | 0x116793 |
| Medical Details: | Request reimbursement for recent surgical procedure |
| Customer Reference: | js123456 |
| Bank Account Number: | 1234.5678.2468.1357 |
| Procedure: | Coronary angioplasty |
| Treatment Cost: | $12750 |
| Hospital Name: | Dallas County Hospital |
| ... | ... |

In the above example, the generated transaction does not require a response from the transaction processor 114. For example, the non-restricted data in the transaction may be sufficient to enable the transaction processor to process the transaction.

Figure 3:
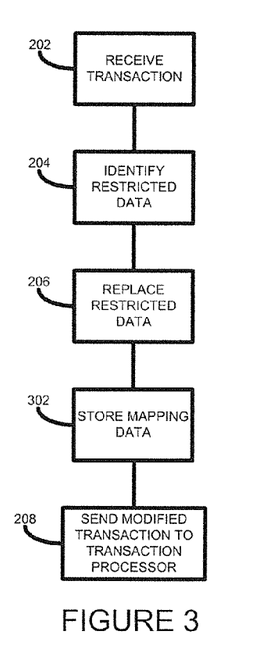
FIG. 3 is a simplified flow diagram outlining a method of operating an element of FIG. 1 according to one example.
Figure 4:
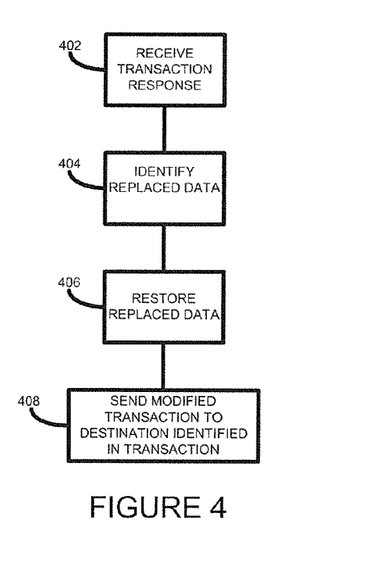
FIG. 4 is a simplified flow diagram outlining a method of operating an element of FIG. 1 according to one example.

A further example will now be described below, with additional reference to FIG. 3 and FIG. 4, which enables the transaction gateway 106 to receive an electronic response from the transaction processor 114, even though the transaction processed by the transaction processor 114 contains none of the restricted data included in the original transaction.

In this example, the method of the above-described blocks 202 to 206 is performed. However, once any restricted data has been replaced in the received transaction (block 206), the transaction gateway 106 stores (block 302) mapping data that maps the original data with the data that is used to replace it. The mapping data may be stored in a suitable memory, database, or storage medium (not shown) in any suitable format. Once the mapping data is stored, the transaction gateway 106 forwards (block 208) the transaction to the transaction processor 114. Example mapping data is shown below in Table 4.

TABLE 4

EXAMPLE MAPPING DATA

| KEY | DATA VALUE |
|---|---|
| 0x665473 | John |
| 0x665474 | Smith |
| 0x665475 | +1.123456789 |
| 0x665476 | 987654321 |
| 0x665477 | jsmith@company.com |

Once the transaction processor 114 has processed the transaction, it generates a response transaction which it sends back to the transaction gateway 106. An example response transaction is shown below in Table 5.

TABLE 5

EXAMPLE RESPONSE TRANSACTION

| FIELD | DATA VALUE |
|---|---|
| Name: | 0x665473 |
| Surname: | 0x665474 |
| Telephone: | 0x665475 |
| Social Security Number: | 0x665476 |
| Email address: | 0x665477 |
| Medical Details: | Request reimbursement for recent surgical procedure |
| Customer Reference: | js123456 |

TABLE 5-continued

EXAMPLE RESPONSE TRANSACTION

| FIELD | DATA VALUE |
|---|---|
| Bank Account Number: | 1234.5678.2468.1357 |
| Procedure: | Coronary angioplasty |
| Treatment Cost: | $12750 |
| Hospital Name: | Dallas County Hospital |
| Comments: | Dear Mr. 0x665474, We have credited your bank account 1234.5678.2468.1357 with $12750. |
| ... | ... |

At block 402 (FIG. 4) the transaction gateway 106 receives the response transaction. At block 404 the transaction gateway identifies any data that was previously replaced by the transaction gateway 106 in the received transaction. At block 406 the transaction gateway replaces any previously replaced restricted data with the original data, for example using the mapping data keys as shown in Table 4 above. An example modified response transaction is shown below in Table 6.

TABLE 6

EXAMPLE RESPONSE TRANSACTION

| FIELD | DATA VALUE |
|---|---|
| Name: | John |
| Surname: | Smith |
| Telephone: | +1.123456789 |
| Social Security Number: | 987654321 |
| Email address: | jsmith@company.com |
| Medical Details: | Request reimbursement for recent surgical procedure |
| Customer Reference: | js123456 |
| Bank Account Number: | 1234.5678.2468.1357 |
| Procedure: | Coronary angioplasty |
| Hospital Name: | Dallas County Hospital |
| Comments: | Dear Mr. Smith, We have credited your bank account 1234.5678.2468.1357 with $12750. |
| ... | ... |

At 408 the transaction gateway 106 sends, in any suitable manner, the modified response transaction to a destination identified in the modified transaction, which is in this case the originator of the transaction in the network 104. For example, the transaction gateway 106 may identify the email address of the transaction originator in the modified response transaction and send the modified response transaction to the identified email address as an email message. It should be reminded, however, that the transaction processor 114 does not see the address within the network 104 of the destination of the transaction.

In a further example the transaction gateway 106 cleans up the mapping database by removing mapping data that has been used to restore mapped data in a response transaction.

Figure 5:
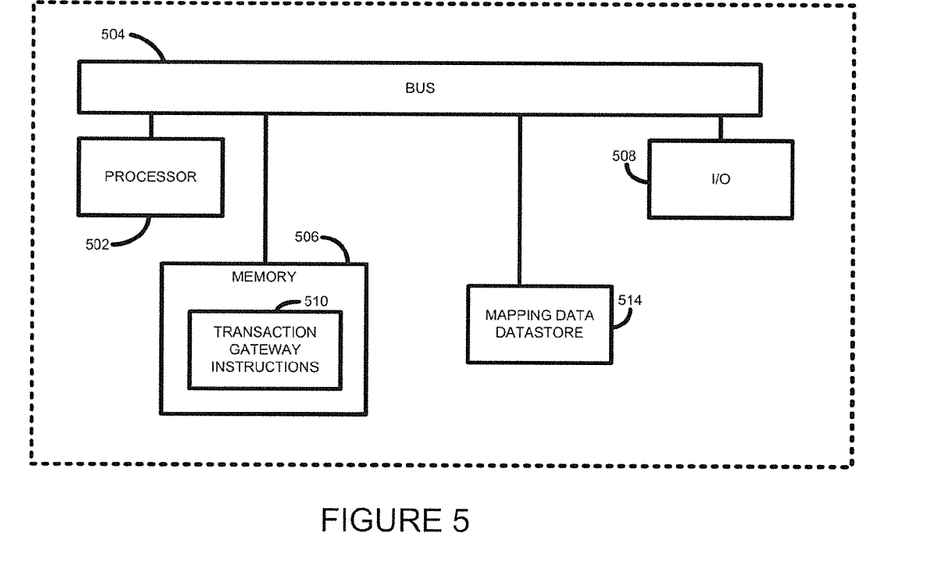
FIG. 5 is a simplified block diagram outlining an implementation of part of the system of FIG. 1 according to one example.

In a further example, as illustrated in FIG. 5, at least part of a transaction gateway, such as the transaction gateway 106, may be implemented using a microprocessor 502 coupled, via a communication bus 504, to a memory 506, an input/output module 508, and mapping data storage 514. The memory 506 stores transaction gateway instructions 510. The instructions 510 are processor understandable instructions that when executed by the processor 502 provide functionality of a transaction gateway as described above.

Figure 6:
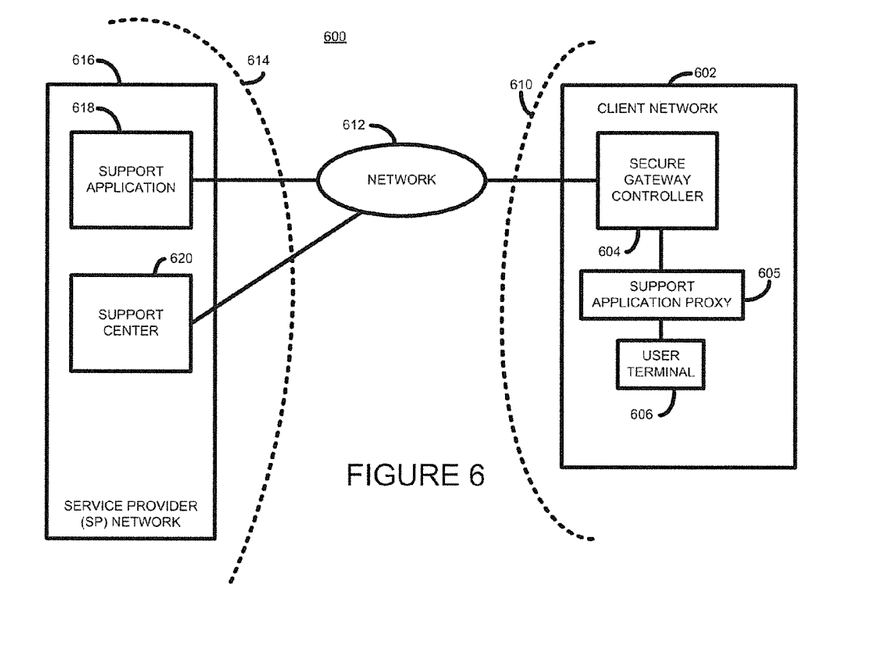
FIG. 6 is a simplified block diagram illustrating a system according to one example.
Figure 7:
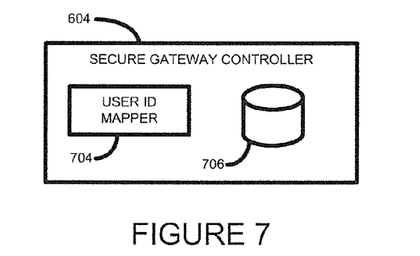
FIG. 7 is a simplified block diagram illustrating part of the system of FIG. 6 in greater detail according to one example.
Figures 8, 9:
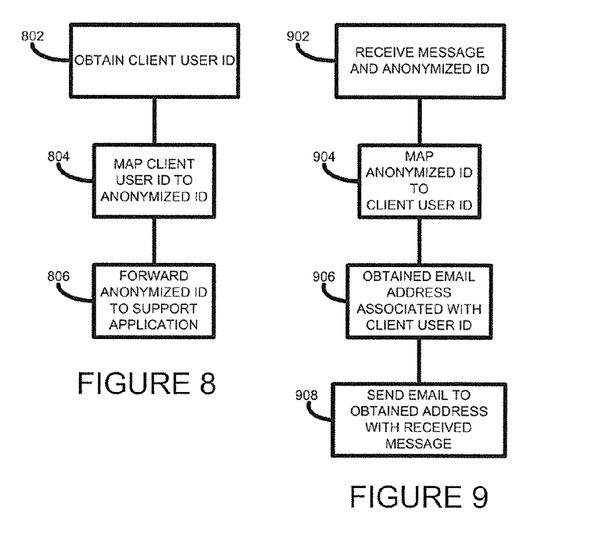
FIG. 8 is a simplified flow diagram outlining a method of operating an element of FIG. 6 according to one example.
FIG. 9 is a simplified flow diagram outlining a method of operating an element of FIG. 6 according to one example.

A further example according to principles described herein will now be described with additional reference to block diagrams of FIGS. 6 and 7, and the flow diagrams of FIGS. 8, and 9. This example illustrates how a service provider in one area may provide a service, such as a support service, to a user of a client network in a second area in a manner such that restricted data within the client network is not communicated outside of the client network.

A client network 602 includes a secure gateway controller 604 and a user computing device 606. The computing device 606 may include, for example, a computer server, a desktop computer, a laptop computer, and a smartphone. A more detailed illustration of the secure gateway controller 604 according to one example of principles described herein is shown in FIG. 7.

A user (or service requestor) using the computing device 606 may request support services from a support service provider 616 located in an area 614, for example by making a service request. An example of how a user may request and receive a support service is described below with additional reference to FIGS. 8 and 9.

A support proxy 605 serves as a proxy to a support application 618 hosted by a service provider network 616. The support application 618 may, in one example, by a web application or a web service.

The support proxy 605 may, in one example, request that the client user authenticates to the support proxy 605 prior to allowing the user access to the support application 618.

At 802 (FIG. 8) the support proxy 605 obtains the user identifier of the user of the computing device 606.

At 804 a user ID mapping module (704, FIG. 7) generates, or maps the user ID to, an anonymized ID, token, or different user ID. The mapping module 704 stores the mapping data in a suitable memory, database, or data store 706. In one example the anonymized ID generated for the same client user ID is always the same.

At 806 the support proxy 605 forwards the anonymized user ID to the support application 618. In this way, the support application 618 does not know the real client identity of the user used within the client network 602, enabling the user to interact with the support application 618 in an anonymized manner.

In one example, the support application 618 is designed not to request restricted data from the user, and identifies the user by way of the anonymized user ID provided by the support proxy 605. The user may then use and interact with the support application 618 to create support requests, to view the status of previously create support requests, and to generally interact with the support application without any restricted data being sent outside of the client network 602.

In a further example, where a legacy support application is used, the support proxy 605 operates to replace any restricted data provided by the user with anonymized data prior before the data is sent to the support application 618. In one example, this is achieved by the support proxy identifying predetermined data fields or data types identified as containing, or potentially containing, restricted data. For instance, the support proxy may determine that data entered in a field entitled "Name" or "Telephone number" may contain restricted data. In a further example, the proxy may use linguistic or data analysis techniques to identify potentially restricted data and to replace any such data with anonymized data.

In a yet further example, the support proxy 605 may execute a version of the support application 618 and pass data provided to the support proxy 605 to the support application 618 after having replaced any identified restricted data with appropriate anonymized data.

In one example the support application proxy 605 may be integral to the secure gateway controller 604.

If the user wishes to receive, for example, telephone support from a support agent (not shown) the user may request this through the support application 618. The support application displays a telephone number of a support agent for the user to call and also generates and displays a support ticket number that is associated with the user's service request and anonymized ID. The support agent answering the user's call requests the support ticket number from the user in order to identify the service request within the support application 618.

If a support agent wishes to communicate with the client electronically, for example via email, the support agent, for example through the support application 618, sends a textual message to the secure gateway controller 604 that includes the anonymized user ID of the client.

At block 902 (FIG. 9) the secure gateway controller 604 receives the message and anonymized user ID. At block 904 the user ID mapping module 704 converts the received anonymized user ID to its corresponding client user ID. At block 906 the secure gateway controller obtains, for example from a client network directory server (not shown), an email address associated with the client user ID. Finally, at block 908 the secure gateway controller sends an email to the obtained user email address containing the received message.

Figure 10:
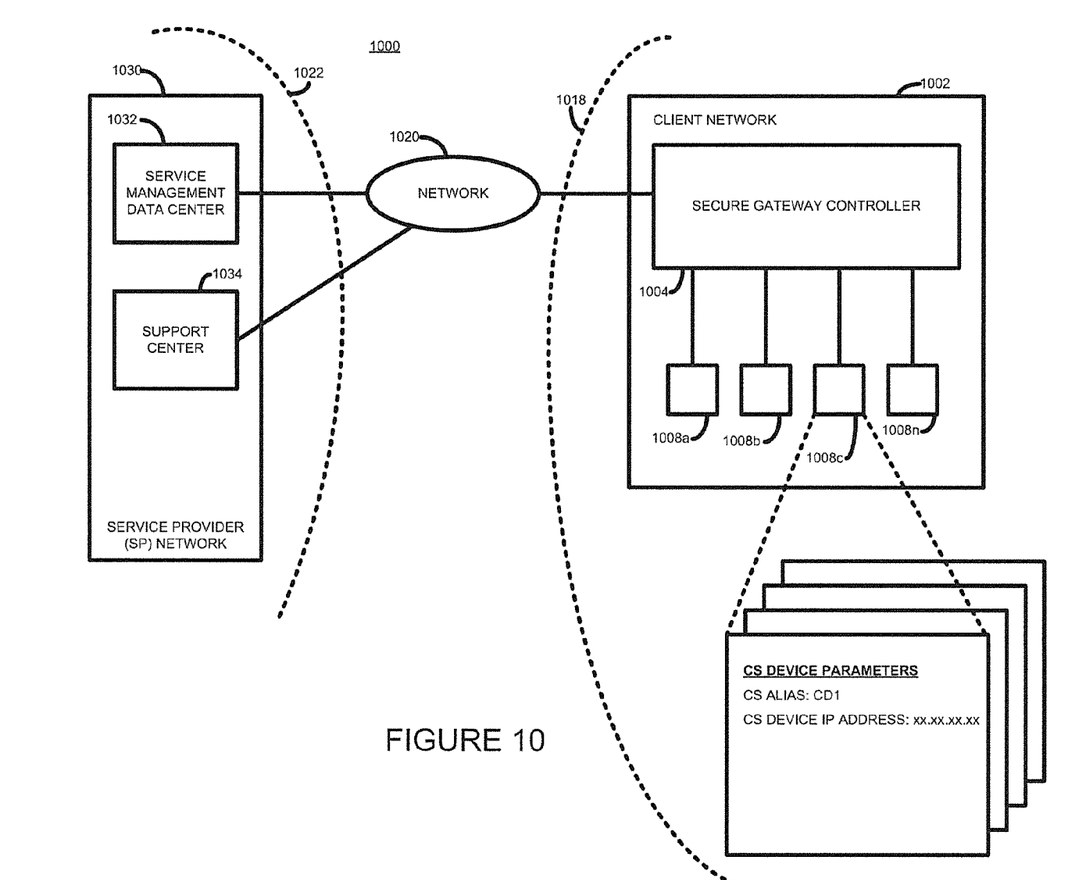
FIG. 10 is a simplified block diagram illustrating a system according to one example.
Figure 11:
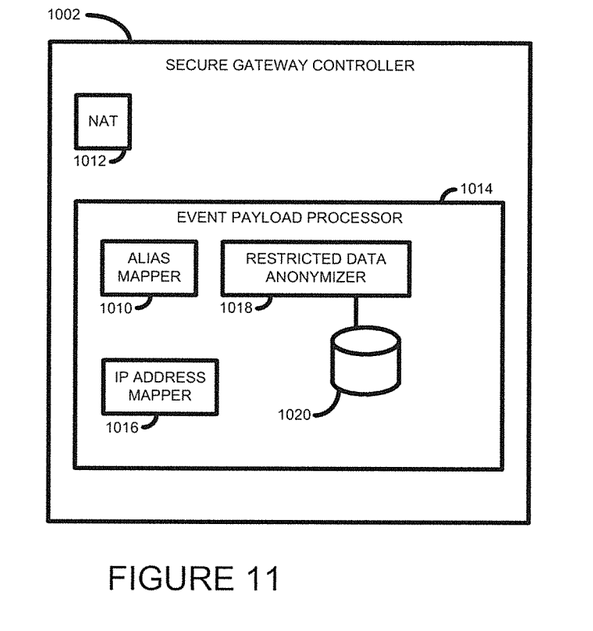
FIG. 11 is a simplified block diagram illustrating part of the system of FIG. 10 in greater detail according to one example.
Figure 12:
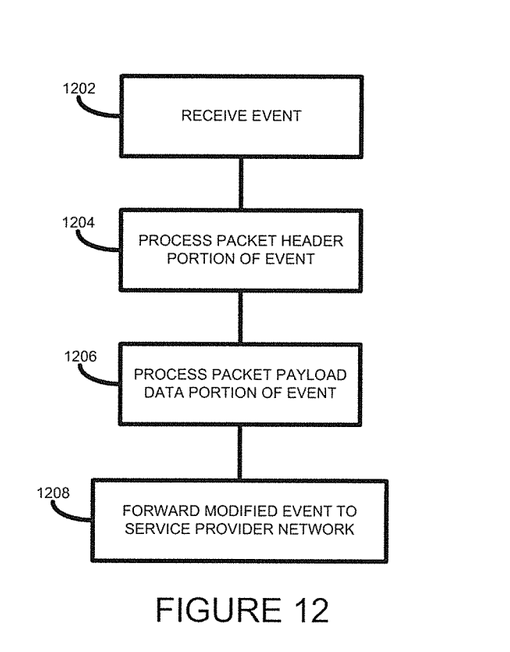
FIG. 12 is a simplified flow diagram outlining a method of operating an element of FIG. 10 according to one example.

A yet further example will now be described with additional reference to FIGS. 10, 11, 12, and 13. FIG. 10 is a simplified block diagram illustrating a system according to principles described herein. FIG. 11 is a simplified block diagram showing a secure gateway controller of FIG. 10 in greater detail, according to principles described herein. FIG. 12 is a simplified flow diagram outlining an example method of operating the secure gateway controller shown FIGS. 10 and 11.

This example illustrates how a service provider in one area 1022 may offer a service, such as a support service, to a client (a service requestor) in a second area 1018 in a manner such that restricted data within a client network 1002 is not communicated outside of the client network 1002.

The client network 1002 includes a secure gateway controller 1004 and a collection of computing devices 1008a to 1008n. The computing devices 1008 may, for example, form part of a client network datacenter or other IT infrastructure and may include, for example, computer servers, desktop computers, laptop computers, and smartphones. The computing devices 1008 are to be provided support by a remote support center 1034 provided through a support service provider network 1030 in an area 1022.

Within the client network 1002 each computing device is assigned an IP address within the client network internal address space, as well as a host name alias.

In order to enable the remote service provider 1030 to provide support to the computing devices of the client network 1002, the service provider generates, for each computing device 1008, an alias and an IP address within the service provider network 1030. Each generated alias and IP address is provided to the client network 1002. The IP addresses are stored in a network address translation (NAT) server 1012 and also in an IP address mapping module 1018. Aliases may be stored in an alias mapping module 1010

A domain name system (DNS) server (not shown) may also be provided within the client network to provide mapping of computing device aliases to computing device IP addresses within the client network address space.

It should be noted, however, that the service provider does not know the client aliases or the client network IP addresses assigned to any computing device within the client network 1002.

In one example each computing device 1008 is monitored by a monitoring application (not shown) that may be supplied or configured by the service provider. In one example, a monitoring application (not shown) may execute on each individual computing device. In a further example, a monitoring application on a further computing device (not shown) may monitor the computing devices 1008.

The monitoring application may monitor a computing device 1008 to detect one or more events. Events may include, for example, notifications, triggers, flags, errors, interrupts, conditions, characteristics, parameters, etc. generated by, detectable on, or associated with a computing device. Such events (or support requests), may be forwarded to the service provider as part of a support contract in which the service provider provides monitoring and support of the client computing device 1008. The monitoring application sends events to the secure gateway controller for forwarding on to the support center 1034, as will be described in further detail below.

In one example an event is sent as a data packet having a packet header portion and a packet payload portion. The header portion may include, for example, the source and destination IP addresses of the packet, protocol data, or other data used for delivering the packet to its intended destination. The packet payload portion may include, for example, details of a support request, problem details, the alias or identifier of a computing device, the IP address of a computing device, and so on. An event packet may, for example, be a UDP or TCP data packet.

An example event is shown below in Table 7.

TABLE 7

EXAMPLE EVENT

PACKET HEADER DATA

| Source IP Address: | 192.68.123.12 |
| Destination IP Address: | 192.68.123.99 |
| Other header data: | ... |

PACKET PAYLOAD

| Device IP Address: | 192.68.123.12 |
| Device Alias: | CD1 |
| Device Type: | Application Server |
| Problem description: | Server storage 95% full |
| Problem severity: | Critical |

At block 1202 (FIG. 12) the secure gateway controller 1002 receives the event from a computing device 1008.

At block 1204 the secure gateway controller 1004 processes the packet header portion of the received event. In one example this is performed using the network address translation (NAT) server 1012 within the secure gateway controller. The NAT server 1012 performs a lookup of the source IP address and converts it to an IP address within the service provider network 1030, using the previously configured IP address mapping data. The NAT server 1012 then replaces the source IP address in the event packet header with the translated source IP address.

At block 1206 the secure gateway controller 1004 processes the packet payload data portion of the event using an event payload processor 1014. The event payload processor 1014 comprises the alias mapping module 1010 which is used for mapping a device alias included in the event payload data with an alias within the service provider network 1030. The event payload processor 1014 also comprises an IP address mapping module 1016 which is used for mapping an IP address included in the event payload data with an IP address within the service provided network 1030. In one example, the event payload processor 1014 may use the network address translation (NAT) server 1012 to perform the IP address mapping.

The event payload processor 1014 also includes a restricted data anonymizer module 1018, and an associated mapping database 1020, to identify any restricted data or restricted data fields within the event payload data with anonymized data.

At block 1208, the secure gateway controller forwards the modified event to the destination IP address in the modified event packet header.

Using the above-described techniques and concepts the event sent outside of the client network 1002 does not contain any restricted data.

The modified event may then be processed by the support center 1034 in an appropriate manner. For example, the support center may determine that one or more instructions are to be send to the computing device that originated the event in order to fix, or to attempt to fix, a problem identified in the event. For example, the support centre may determine that instructions instructing the computing device to mount an additional hard disk are to be sent to the computing device that originated the event.

The support center 1034 may then send a response event back to the computing device that originated the event. It should be noted, however, that the support center 1034 does not know the identity or IP address of the computing device within the client network, only an IP address and/or alias within the service provider network 1030.

At block 1202 the secure gateway controller 1002 receives an event from the support center 1034.

At block 1204 the secure gateway controller processes the packet header portion of the received event. In one example this is performed using the network address translation (NAT) server 1012 within the secure gateway controller. The NAT server 1012 performs a lookup of the source IP address and converts it to an IP address within the client network 1002, using the previously configured IP address mapping data. The NAT server 1012 then replaces the source IP address in the event packet header with the translated source IP address.

At block 1206 the secure gateway controller 1004 processes the packet payload data portion of the event using an event payload processor 1014. The alias mapping module 1010 is used for mapping a device alias included in the event payload data with an alias within the client network 1002. The IP address mapping module 1016 is used for mapping an IP address included in the event payload data to an IP address within the client network 1002. In one example, the event payload processor 1014 may use a translation table in the network address translation (NAT) server 1012 to perform the IP address mapping.

The event payload processor 1014 uses the anonymizer module 1018 to identify any previously anonymized data and to restore the data to its original form.

At block 1208, the secure gateway controller forwards the modified event to the destination IP address in the modified event packet header.

Figure 13:
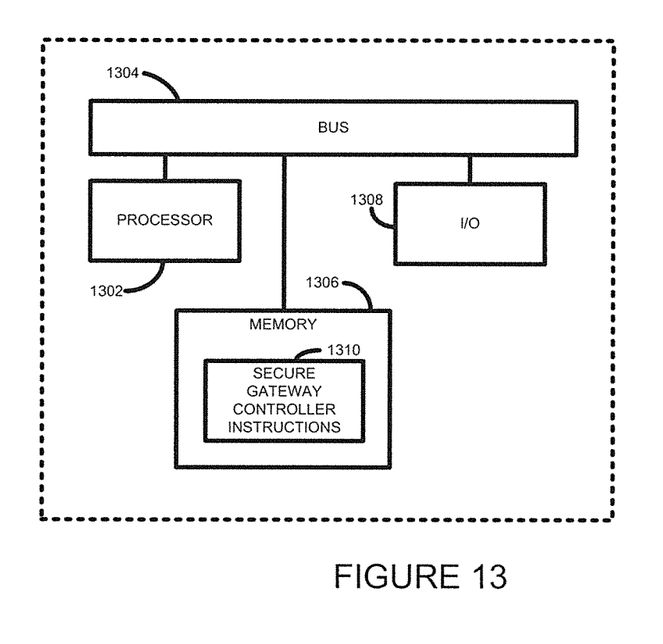
FIG. 13 is a simplified block diagram outlining an implementation of part of the system of FIG. 10 according to one example.

In a still further example, as illustrated in FIG. 13, at least part of the previously-mentioned transaction gateway, such as the transaction gateway 604 or 1004, may be implemented using a microprocessor 1302 coupled, via a communication bus 1304, to a memory 1306, and an input/output module. The memory 1306 stores transaction gateway instructions 1310. The instructions 1310 are processor understandable instructions that when executed by the processor 1302 provide functionality of a transaction gateway as described above.

It will be appreciated that examples of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the principles described herein. Examples may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A transaction gateway in a first network, the transaction gateway comprising a processor and memory and being arranged to:
   receive, from a user device within the first network via a support application proxy within the first network, a support request from a user of the user device, the transaction including the support request;
   identify a user identifier of the user in the transaction;
   modify the received transaction by replacing the user identifier with replacement data different to the identified user identifier;
   send the modified transaction over a third network to a support application in a second network;
   receive, over the third network from the support application, a support response in reply to the support request within a reply transaction including the replacement data;
   identify the replacement data in the reply transaction;
   modify the received reply transaction by replacing the identified replacement data with the user identifier;
   send the modified reply transaction to the user device within the first network via the support application proxy within the first network,
   wherein the support request and the support response are part of a support session between the user and support personnel of the support application, the replacement data lacking personally identifying data of the user.

2. The transaction gateway of claim 1, wherein the transaction gateway is further arranged to:
   maintain a mapping database of identified restricted data and corresponding replacement data.

3. The transaction gateway of claim 1, wherein the transaction gateway is further arranged to identify restricted data in the transaction by one of: identifying data in a predetermined data field in the transaction; identifying a flag associated with a data field in the transaction; or performing lexical, textual, or numerical analysis on data in the transaction.

4. The transaction gateway of claim 1, wherein the transaction gateway is further arranged to generate replacement data from which the corresponding restricted data is not directly derivable.

5. The transaction gateway of claim 1, wherein the restricted data is data that is identified as data not to be transmitted outside of the first network.

6. The transaction gateway of claim 1, wherein the restricted data is data that is identified as being subject to legislative restrictions on where the data may be sent.

7. A system for providing a service to a service requestor, the service being provided by a support center, the system comprising:
   a support application proxy comprising a processor and memory for receiving a service request from the service requestor, the service requestor being a user device associated with a user; and
   a gateway controller comprising a processor and memory, and arranged to:
   receive directly from the support application proxy the service request;
   identify data in the service request not to be sent to the support center, the data being a user identifier of the user of the user device;
   generate a modified service request by replacing identified data with replacement data; and
   send the modified service request to the support center;
   receive from the support center a service response in reply to the service request and including the replacement data; and
   send a modified service response directly to the support application proxy,
   wherein the support application proxy is to responsively send the modified service response to the service requestor,
   and wherein the service request and the service response are part of a support session between the user of the user device and support personnel of the support application, the replacement data lacking personally identifying data of the user.

8. The system of claim 7, wherein the gateway controller is further arranged to:
   store in a mapping database identified data and associated replacement data.

9. The system of claim 7, wherein the service request includes a network address or alias of the user device.

10. The system of claim 9, wherein the service request includes header data and payload data, the gateway controller further comprising:
    a network address translator to replace, in the header data, the network address of the computing device in a first network with a network address in a second network.

11. The system of claim 10, wherein the gateway controller further comprises a payload processor to identify data in the data payload not to be sent outside of the first network and to replace such data with the replacement data.

12. The system of claim 7, wherein the gateway controller is arranged further to:
    identify the replacement data in the service response; and
    modify the received service response by replacing the identified replacement data with the data to generate the modified service response.

13. A non-transitory, machine-readable medium that stores machine-readable instructions executable by a processor to provide a method of providing a service, the non-transitory, machine-readable medium comprising:
- machine readable instructions that, when executed by the processor, provide a gateway controller on a first network to:
  - receive, from a user device within the first network via a support application proxy within the first network, a support request from a user of the user device, the transaction including the support request;
  - identify restricted data in the transaction, the restricted data being a user identifier of the user of the user device;
  - modify the received transaction by replacing identified restricted data with replacement data different to the identified restricted data;
  - send the modified transaction over a third network to a support application in a second network;
  - receive, over the third network from the support application in the second network, a support response in reply to the support request within a reply transaction including the replacement data;
  - identify the replacement data in the reply transaction;
  - modify the received reply transaction by replacing the identified replacement data with the restricted data;
  - send the modified reply transaction to the user device within the first network via the support application proxy within the first network,
  - wherein the support request and the support response are part of a support session between the user of the user device and support personnel of the support application, the replacement data lacking personally identifying data of the user.

14. The non-transitory machine-readable medium of claim 13, further comprising
- machine readable instructions that, when executed by the processor, store, in a mapping database, identified data and associated replacement data.

* * * * *